United States Patent [19]

Chattha

[11] 4,181,783
[45] Jan. 1, 1980

[54] HIGH SOLIDS COATING COMPOSITION ADAPTED FOR USE AS AUTOMOTIVE TOPCOAT—#4

[75] Inventor: Mohinder S. Chattha, Livonia, Mich.
[73] Assignee: Ford Motor Company, Dearborn, Mich.
[21] Appl. No.: 945,029
[22] Filed: Sep. 22, 1978

Related U.S. Application Data

[63] Continuation-in-part of Ser. No. 864,964, Dec. 27, 1977, abandoned.
[51] Int. Cl.$^2$ ............................................. C08L 63/08
[52] U.S. Cl. ................................. 525/161; 260/42.22; 260/42.52; 525/162; 525/913
[58] Field of Search ........................................ 260/834

[56] References Cited

U.S. PATENT DOCUMENTS

| | | | |
|---|---|---|---|
| 2,528,359 | 10/1950 | Greenlee | 260/834 |
| 2,528,360 | 10/1950 | Greenlee | 260/834 |
| 2,541,027 | 2/1951 | Bradley | 260/2 EC |
| 2,732,367 | 1/1956 | Shokal | 260/834 |
| 2,849,418 | 8/1958 | Fang | 260/836 |
| 3,133,838 | 5/1964 | Higgins | 260/837 R |
| 3,198,850 | 8/1965 | Levantin | 260/837 R |
| 3,651,169 | 5/1972 | Davis | 260/834 |
| 3,960,979 | 6/1979 | Khanna | 260/834 |
| 4,027,066 | 5/1977 | Victorius | 260/834 |
| 4,055,607 | 10/1977 | Sullivan | 260/834 |

Primary Examiner—Paul Lieberman
Attorney, Agent, or Firm—Roger L. May; Keith L. Zerschling

[57] ABSTRACT

A fast curing, high solids coating composition that is adapted for use as an automotive topcoat and which upon curing forms a hard, glossy, durable coating exhibiting excellent resistance to solvents and water. The coating composition contains greater than about 60 percent by weight of nonvolatile solids and, exclusive of pigments, solvents and other nonreactive components, consists essentially of:

(A) a bifunctional copolymer bearing hydroxy functionality and pendant epoxy functionality, having a number average molecular weight ($M_n$) of between about 1500 and about 10,000 and a glass transition temperature (Tg) of between about −25° and about 70°:
(B) a reactive catalyst comprising at least one hydroxy functional organophosphate ester selected from certain mono-and diesters of phosphoric acid;
(C) an amine-aldehyde crosslinking agent; and
(D) optionally, a hydroxy functional additive. The hydroxy functional organophosphate ester is included in the composition in an amount sufficient to provide between about 0.67 and about 1.4 equivalents of acid functionality in copolymer (A), and the amino crosslinking agent is included in the composition in an amount sufficient to provide at least about 0.4 equivalents of nitrogen crosslinking functionality for each equivalent of hydroxy functionality included in the composition.

20 Claims, No Drawings

HIGH SOLIDS COATING COMPOSITION ADAPTED FOR USE AS AUTOMOTIVE TOPCOAT—#4

BACKGROUND OF THE INVENTION

This application is a continuation-in-part of Ser. No. 864,964 filed Dec. 27, 1977 and now abandoned.

This invention relates to a fast curing, high solids, thermosetting coating composition. More particularly, the invention relates to a polymeric, high solids, fast curing coating composition adapted to provide an automotive topcoat which demonstrates hardness, high gloss, outstanding durability and excellent resistance to solvents and water. Still more particularly, this invention relates to a fast curing, high solids, thermosetting coating composition adapted to be used as an automotive topcoat wherein the topcoat includes metallic flake as a pigment.

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability, and low solvent and water resistance. Many of the proposed compositions have been particularly deficient as automotive topcoats, particularly when the topcoat is to include metallic flake as a pigment.

The deficiency in compositions including metallic flake results from undesired reorientation of the metallic flake during application and curing of the coating. The flake reorientation results primarily because of the very low viscosity resins used in the paint compositions to accommodate high solids. The low viscosity is not sufficient to immobilize the flakes which tend to redistribute themselves to show "reverse flop" and nonuniform distribution.

The coating compositions of this invention combine the above discussed desired properties and low application viscosity with rapid cure so as to overcome deficiencies of previously proposed high solids materials and thereby achieve a high solids coating composition particularly adapted for automotive topcoats and still more particularly adapted for automotive topcoats including metallic flake as a pigment.

SUMMARY OF THE INVENTION

The thermosetting coating composition of this invention contains greater than about 60 percent by weight of nonvolatile solids, preferably greater than about 70 percent by weight, and is capable of curing rapidly at a low temperature. The composition, exclusive of pigments, solvents and other nonreactive components, consists essentially of:

(A) a bifunctional copolymer bearing hydroxy functionality and pendant epoxy functionality, having a number average molecular weight ($\overline{M}_n$) of between about 1500 and about 10,000 and a glass transition temperature (Tg) of between about $-25°$ and about $70°$ C., the copolymer consisting of (i) between about 5 and about 25 weight percent of monoethylenically unsaturated monomers bearing glycidyl functionality and between about 5 and about 25 weight percent of monoethylenically unsaturated monomers bearing hydroxy functionality, with the total of the monoethylenically unsaturated monomers bearing either said glycidyl functionality or said hydroxy functionality being not greater than about 30 weight percent of the monomers in the bifunctional copolymer, and (ii) between about 90 and about 70 weight percent of other monoethylenically unsaturated monomers;

(B) a reactive catalyst comprising at least one organo phosphate ester having the formula:

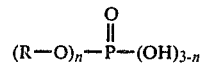

wherein $n = 1$ to 2 and R is selected from the group consisting of mono- or dehydroxy alkyl, cycloalkyl or aryl radicals;

(C) an amine-aldehyde crosslinking agent; and (D) up to about 45 weight percent based on the total weight of (A), (B), (C) and (D) of a hydroxy functional resin having a number average molecular weight ($\overline{M}_n$) of between about 150 and about 6000.

The organophosphate ester is included in the composition in an amount sufficient to provide between about 0.67 and about 1.4 equivalents, preferably between about 0.8 and about 1 equivalents, of acid functionality for each equivalent of pendent epoxy functionality on the bifunctional copolymer. The amino resin crosslinking agent is included in the composition in an amount sufficient to provide at least about 0.4 equivalents, preferably between about 0.6 and about 2.1 equivalents, of nitrogen crosslinking functionality for each equivalent of hydroxy functionality included in the composition either as (i) an organic hydroxyl group on said organophosphate ester, (ii) a hydroxyl group on said bifunctional copolymer, (iii) a hydroxyl group on said hydroxy functional resin, or (iv) as a result of esterification of the pendent epoxy functionality of said bifunctional copolymer during cure of the composition. In addition, the high solids coating composition of the invention may include additives such as catalysts, antioxidants, U.V. absorbers, flow control or wetting agents, antistatic agents, pigments, plasticizers, solvents, etc.

PRIOR ART

U.S. Pat. Nos. 3,960,979 and 4,018,848 to Khanna teach high solids coating compositions adapted for use as a can coating material. The compositions consist essentially of (i) aromatic epoxide compositions having two or more epoxy groups on an epoxy resin which has a molecular weight not exceeding 2500; (ii) an amino crosslinking agent; (iii) an inorganic or organic monomeric or polymeric acid which acts as a reactive catalyst; and (iv) a flexiblizing polyol.

The compositions of Khanna have the advantage of quick reaction and low application viscosity, but lack durability and, therefore, do not weather well. This is, in part, because of the presence of ether linkages in the aromatic epoxides. As such, the compositions of Khanna are not desirable for use as automotive topcoats. The Khanna patents describe the compositions as a low cure system. However, when considering the specific teachings of the patents one finds that the composition includes an excess of epoxide resin apparently with the purpose of "killing off" excess catalyst after completion of the curing reaction. Excess epoxy resin in the composition remains uncured at the low temperature bake range of the baking temperatures disclosed, not giving a complete cure and desirable hardness, durability or solvent resistance. If heated to higher temperatures, as called for in the examples, the excess epoxy does react with excess hydroxy functionality to give still further ether linkages. These ether linkages so obtained have a further deleterious effect on durability and make the materials particularly unsuitable for use as an automotive topcoat. Also, the necessary high bake temperatures to achieve the utilization of this excess epoxy makes the composition undesirable from an energy point of view. Still further, because the epoxy/catalyst reaction occurs in early stages of the cure, thus "killing off" the catalyst, the melamine hydroxy curing reaction must proceed substantially without benefit of catalysis. The curing reaction thus proceeds slowly and requires the higher temperatures of the Khanna examples.

DETAILED DESCRIPTION OF THE INVENTION

The high solids coating compositions of this invention overcome disadvantages of prior art high solids compositions, including those of Khanna, to provide a system which is particularly suitable for those applications requiring high gloss, hardness, durability, and high solvent and water resistance as well as a fast cure rate at low temperatures, e.g., between about 75° C. and about 150° C. preferably between about 110° C. and about 130° C. The desirable characteristics of the coating compositions of this invention result from the carefully controlled admixture of the particular components, including a hydroxy functional organophosphate ester, to achieve substantially complete utilization of reactant functionality and a resultant highly crosslinked coating in a fast and efficient manner.

Each of the components of the high solids coating compositions, the amounts of each of the components required to achieve the desired results of the invention and a method for applying the composition are described hereinafter in greater detail.

Bifunctional Copolymer

A principal material in the high solids coating compositions of this invention is a bifunctional copolymer bearing both hydroxy functionality and pendent epoxy functionality and which may be prepared by conventional free radical induced polymerization of suitable unsaturated monomers. The term "copolymer" as used herein means a copolymer of two or more different monomers.

The copolymers used in the high solids coating compositions of this invention have a number average molecular weight ($\overline{M}_n$) of between about 1500 and about 10,000, preferably between about 2,000 and about 6,000 and a glass transition temperature (Tg) of between about −25° C. and about 70° C., preferably between about −10° C. and about 50° C. The monomers used to prepare the copolymer include between about 5 and about 25 weight percent of one or more monoethylenically unsaturated monomers bearing glycidyl functionality and between about 5 and about 25 weight percent of one or more monoethylenically unsaturated monomers bearing hydroxy functionality, with the total of the monoethylenically unsaturated monomers bearing either epoxy hydroxy functionality being not greater than about 30 weight percent of the monomers in the copolymer. The monoethylenically unsaturated monomers bearing glycidyl functionality may be either glycidyl ethers or glycidyl esters. Preferably, however, the epoxy functional monomers are glycidyl esters of monoethylenically unsaturated carboxylic acids. Examples are glycidyl acrylates and glycidyl methacrylates. These monomers provide the bifunctional copolymer with the pendent epoxy functionality.

The monoethylenically unsaturated hydroxy functional monomers useful in preparation of the copolymer and providing the hydroxy functionality to the copolymer may be selected from a long list of hydroxy functional monomers. Preferably, however, the hydroxy functional monomers are acrylates and may be selected from the group consisting of, but not limited to, the following esters of acrylic or methacrylic acids and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3 dihydroxypropyl acrylate; 2-hydroxy-butyl acrylate; 4-hydroxybutyl acrylate; diethylene-glycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2,3 dihydroxypropyl methacrylate; 2-hydroxybutyl methacrylate; 4-hydroxybutyl methacrylate; 3,4 dihydroxybutyl methacrylate; 5-hydroxypentyl methacrylate; 6-hydroxyhexyl methacrylate; 1,3-dimethyl-3-hydroxybutyl methacrylate; 5,6 dihydroxyhexyl methacrylate; and 7-hydroxyheptyl methacrylate.

Although one of ordinary skill in the art will recognize that many different hydroxyl bearing monomers, including those listed, above could be employed, the preferred hydroxy functional monomers for use in the bifunctional copolymer of the invention are $C_5$–$C_7$ hydroxy alkyl acrylates and/or $C_5$–$C_7$ hydroxy alkyl methacrylates, i.e., esters of $C_2$–$C_3$ dihydric alcohols and acrylic or methacrylic acids.

The remainder of the monomers forming the qualitatively difunctional copolymer, i.e., between about 90 and about 70 weight percent of the monomers of the copolymer, are other monoethylencially unsaturated monomers. These monoethylenically unsaturated monomers are preferably alpha beta olefinically unsaturated monomers, i.e., monomers bearing olefinic unsaturation between the two carbon atoms in the alpha and beta positions with respect to the terminus of an aliphatic carbon-to-carbon chain.

Among the alpha-beta olefinically unsaturated monomers which may be employed are acrylates (meaning esters of either acrylic or methacrylic acids) as well as mixtures of acrylates and vinyl hydrocarbons. Preferably, in excess of 50 weight percent of the total of the copolymer monomers are esters of $C_1$–$C_{12}$ monohydric alcohols and acrylic or methacrylic acids, e.g., methylmethacrylate, ethylacrylate, butylacrylate, butylmethacrylate, hexylacrylate, 2-ethylhexylacrylate, laurylmethacrylate, etc. Among the monovinyl hydrocarbons suitable for use in forming the copolymers are those containing 8 to 12 carbon atoms and including styrene, alpha methylstyrene, vinyl toluene, t-butylstyrene and chlorostyrene. When such monovinyl hydrocarbons are employed, they should constitute less than 50 weight percent of the copolymer. Other monomers such as vinyl chloride, acrylonitrile, methacrylonitrile, and vinyl acetate may be included in the copolymer as modifying monomers. However, when employed, these modifying monomers should constitute only between about 0 and about 30 weight percent of the monomers in the copolymer.

In preparing the bifunctional copolymer, the epoxy functional monomers, the hydroxy functional monomers and the remaining monoethylenically unsaturated monomers are mixed and reacted by conventional free radical initiated polymerization in such proportions as to obtain the copolymer desired. A large number of free radical initiators are known to the art and are suitable for the purpose. These include: benzoyl peroxide; lauryl peroxide; t-butylhydroxy peroxide; acetylcyclohexyl-sulfonyl peroxide diisobutyryl peroxide; di-(2-ethyl-hexyl) peroxydicarbonate; diisopropylperoxydicarbonate; t-butylperoxypivalate; decanoyl peroxide, azobix (2-methylpropionitrile), etc. The polymerization is preferably carried out in solution using a solvent in which the epoxy functional copolymer is soluble. Included among the suitable solvents are toluene, xylene, dioxane, butanone, etc. If the epoxy functional copolymer is prepared in solution, the solid copolymer can be precipitated by pouring the solution at a slow rate into a nonsolvent for the copolymer such as hexane, octane, or water under suitable agitation conditions.

The bifunctional copolymer useful in the compositions of this invention can also be prepared by emulsion polymerization, suspension polymerization, bulk polymerization, or combinations thereof, or still other suitable methods. In these methods of preparing copolymers, chain transfer agents may be required to control molecular weight of the copolymer to a desired range. When chain transfer agents are used, care must be taken so they do not decrease the shelf stability of the composition by causing premature chemical reactions.

Organophosphate Ester

A second essential component of the high solids coatings of this invention is a reactive catalyst which comprises a novel hydroxy functional organophosphate ester which is present in the composition as a mono- or diester or as a mixture of such mono-and diesters. The hydroxy functional organophosphate esters useful in the compositions of the invention are those having the formula:

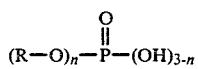

wherein n=1 to 2 and R is selected from the group consisting of mono or dihydroxy alkyl, cycloalkyl, or aryl radicals. Preferably, the hydroxy bearing alkyl, cycloalkyl or aryl radical contains 3 to 10 carbon atoms.

Among the numerous suitable mono- or dihydroxy functional radicals are: 2-ethyl-3-hydroxyethyl; 4-methylol-cyclohexylmethyl; 2,2 diethyl-3-hydroxypropyl; 8-hydroxyoctyl; 6-hydroxyhexyl; 2,2 dimethyl-3-hydroxypropyl; 2-ethyl-2-methyl-3-hydroxypropyl; 7 hydroxyheptyl; 5-hydroxypentyl; 4-methylolbenzyl; 3-hydroxyphenyl; 2,3 dihydroxypropyl; 5,6 dihydroxyhexyl; 2-(3-hydroxycyclohexyl)-2-hydroxyethyl; and 2-(3-hydroxypentyl)-2-hydroxyethyl.

The above radicals are intended to be only exemplary and numerous other radicals falling within the defined scope of the the organophosphate esters useful in the compositions of invention will be apparent to those skilled in the art. Among the most preferred radicals are mono- or dihydroxy functional alkyl radicals containing 3 to 10 carbon atoms.

A preferred method for preparing the hydroxyfunctional organophosphate esters useful in the compositions of the invention is by an esterification reaction between an excess of an alkyl, cycloalkyl or aryl diol or triol and phosphorus pentoxide. When a triol is used as a reactant, preferably at least one of the hydroxyl groups should be secondary. The reaction between the diol or triol and the phosphorus pentoxide is generally carried out by adding phosphorus pentoxide portionwise to an excess of diol or triol in a liquid state or in solution in a suitable solvent.

A preferred temperature for carrying suitable solvents include, but are not limited to, butylacetate, methyl ethyl ketone, methyl amyl ketone, toluene, xylene, etc. out the reaction is between about 50° C. and about 60° C. Due to the multiple hydroxy functionality of the diol or triol reactant, minor amounts of polymeric acid phosphate as well as certain cyclophosphates are also generated during the synthesis. These polymeric and cyclic materials also serve as a reactive catalyst and, therefore, need not be separated from the hydroxyphosphate esters described above. In fact, it has been found advantageous in preferred embodiments of the invention to employ all reaction products, i.e., the hydroxyfunctional organophosphate esters and the minor amount of polymeric acid phosphate, cyclophosphates, as well as excess diol or triol in the coating compositions. The excess diol or triol serves in those compositions as the optional hydroxy functional additive.

Reactive catalysts prepared by the above preferred method will generally include about a 1 to 1 ratio of the mono- and diester organophosphate.

Still another preferred method of preparing the hydroxy functional organophosphate esters useful in compositions of the invention is by an esterification reaction between phosphoric acid and an alkyl, cycloalkyl or aryl monoepoxide. This reaction is carried out by: adding between about 1 and about 2 moles, preferably between about 1 and about 1.5 moles of the monoepoxy material to 1 mole of phosphoric acid or its solution in a suitable solvent as above. During the esterification reaction which occurs, a hydroxyl group is formed. If a dihydroxy radical is desired in the organophosphate ester, a monoepoxide bearing hydroxy functionality may be used as a reactant. Preferred monepoxide materials useful in this method are well known monoepoxides selected from monoepoxy ethers, monoepoxy esters and alkylene oxides. Exemplary of preferred monoepoxides for use in this esterification reaction are: propylene oxide, butylene oxide, cyclohexene oxide, styrene oxide, n-butyl glycidyl ether, ethyl glycidyl ether, n-butyl epoxy stearate and glycidyl acetate.

As will be understood by those skilled in the art, the proportion of monoester and diester formed by the reaction will vary with the selected molar ratio of the monoepoxide and the phosphoric acid. When 1 mole of monoepoxide is used per mole of phosphoric acid primarily monoester is formed while a molar ratio of 2 to 1 results in primarily diester. A molar ratio of 1.5 to 1 will result in an approximately 1 to 1 mixture of mono- and diesters. In all cases a minor amount of the triester will be formed. While the triester obviously will not serve as a reactive catalyst it will crosslink with the amino crosslinking agent of the composition and, thus, may be safely included.

The hydroxy functional organophosphate ester component of the high solids coating composition of the invention is a reactive catalyst which allows the composition to cure rapidly at a low temperature. The acid functionality of the mono- or diester or mixture of such esters reacts with the pendent epoxy functionality of the bifunctional copolymer to form an ester and a hydroxyl group. This hydroxyl group, as well as the organic hydroxyl groups on the hydroxy functional organo-phosphate ester, the additional hydroxy functionality on the bifunctional copolymer and any optional hydroxyl groups included in the composition in the form of hydroxy functional additive including excess polyol present from the synthesis of the hydroxy functional organophosphate ester, crosslinks with the amino resin crosslinking agent. It is critical to achieving the desired results of the high solids coating compositions of this invention, i.e., in making them suitable for use as automotive topcoats, that the amount of the hydroxy functional organophosphate ester be sufficient to convert substantially all of the epoxy functionality on the bifunctional copolymer to the desired hydroxy functionality by esterification reaction. Therefore, the organophosphate ester is included in the composition in an amount sufficient to provide between about 0.67 and about 1.4 equivalents, preferably between about 0.8 and about 1 equivalents, of acid functionality for each equivalent of pendent epoxy functionality on the bifunctional copolymer. As will be noted from the equivalent amounts of epoxy and organophosphate acid ester functionality stated above, the acid functionality need not be in stoichiometric amounts to the epoxy functionality. This is because of the fact that during curing of the high solids coating composition, residual water present in the composition hydrolyzes some of the esterified product back to acid and this esterified product then, in turn, reacts with additional epoxy functionality.

Amino Crosslinking Agent

A third essential component of the high solids paint compositions of this invention is an amine-aldehyde crosslinking agent. Amine-aldehyde crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amine-aldehyde crosslinking agents useful in this invention are condensation products of formaldehyde with melamine, substituted melamine, urea, benzoguanamine or substituted benzoguanamine. Preferred members of this class are methylated melamine-formaldehyde resins such as hexamethoxymethylmelamine. These liquid crosslinking agents have substantially 100% nonvolatile content as measured by the foil method at 45° C. for 45 minutes. For the purposes of the invention it should be recognized that it is important not to introduce extraneous diluents that would lower the final solids content of the coating.

Particularly preferred crosslinking agents are the amino crosslinking agents sold by American Cyanamide under the trademark "Cymel". In particular, Cymel 301 Cymel 303 and Cymel 1156, which are alkylated melamine-formaldehyde resins, are useful in the compositions of the invention by reacting with hydroxy functionality included in the composition (i) as an organic hydroxyl group on the hydroxy functional organophosphate ester, (ii) as hydroxy functionality on the bifunctional copolymer, (iii) as hydroxy functionality on the optional hydroxy functional additive, or (iv) as a result of esterification of the pendent epoxy functionality on the bifunctional copolymer.

In order to achieve the outstanding properties which make these coating compositions particularly useful as automotive topcoat materials, it is essential that the amount of amino crosslinking agent be sufficient to substantially completely crosslink the hydroxy functionality in the coating composition. Therefore, the amino crosslinking agent should be included in the composition in an amount sufficient to provide at least about 0.4 equivalents, preferably between about 0.6 and about 2.1 equivalents, of nitrogen crosslinking functionality for each equivalent of hydroxy functionality included in the composition as discussed above.

Optional Hydroxy Functional Additive

Additional hydroxy functionality other than that achieved by esterification of pendent epoxy functionality of the bifunctional copolymer may be achieved by adding a hydroxy functional additive in amounts up to about 45 weight percent based on the total of the three above discussed components and the hydroxy functional additive itself. Such a material serves to provide additional hydroxy functionality so as to provide a more intimate crosslinked structure in the final cured product. The hydroxy functional additives useful in the composition are preferably selected from various polyols having a number average molecular weight ($\overline{M}_n$) of between about 150 and about 6000, preferably between about 400 and about 2500. As used herein the term polyol means a compound having two or more hydroxyl groups.

The polyols useful for the invention preferably are selected from the group consisting of: (i) hydroxy functional polyesters; (ii) hydroxy functional polyethers; (iii) hydroxy functional oligoesters, (iv) monomeric polyols, (v) hydroxy functional copolymers produced by free radical polymerization of monoethylenically unsaturated monomers, one of which bears hydroxy functionality and which is included in the copolymer in an amount ranging from about 2.5 to about 30 weight percent of the copolymer and (vi) mixtures of (i)–(v).

The hydroxy functional polyesters useful in the invention are preferably fully saturated products prepared from aliphatic dibasic acids containing 2–20 carbon atoms, such as succinic acid, glutaric acid, adipic acid, azelaic acid, etc., and short chain glycols of up to and including 21 carbon atoms, such as ethylene glycol, 1,2-propylene glycol, 1,3-propylene glycol, 1,2-butylene glycol, 1,3-butylene glycol, 1,4-butylene glycol, neopentyl glycol, 1,4-cyclohexane dimethylol, 1,6-hexamethylene glycol and 2-ethyl-2-methyl-1,3 propane diol. The molecular weight of these materials ranges from about 200 to about 2500 and the hydroxyl number ranges from about 30 to about 230. The hydroxyl number is defined as the number of milligrams of potassium hydroxide needed for each gram of sample to neutralize the acetic acid generated during the reaction between the polyol and excess acetic anhydride. The polyester polyols utilized in the invention are low melting, soft waxy solids which are easily maintained in the molten state.

Among preferred polyesters are products derived from the esterification of ethylene glycol and 1,4 butane diol with adipic acid, ethylene glycol and 1,2 propylene glycol with adipic acid, azelaic acid and sebacic acid copolyester diols, and mixtures thereof.

Among useful polyether diols are polytetramethylene ether glycol, polyethylene glycol, polypropylene glycol and the like.

The hydroxy functional oligoesters useful as hydroxy functional additives in the compositions of the invention are oligoesters preferably having a molecular weight of between about 150 and about 3000. Such oligoesters may be selected from the group consisting of: (i) oligoesters prepared by reacting a dicarboxylic acid with a monoepoxide such as an alkylene oxide; (ii) oligoesters prepared by reacting a polyepoxide with a monocarboxylic acid; and (iii) oligoesters prepared by reacting a hydroxy functional monocarboxylic acid with either a mono- or polyepoxide.

The oligoester prepared by reacting a dicarboxylic acid with an alkylene oxide is a low molecular weight adduct which has a narrow molecular weight distribution when compared to similar compositions made by normal polyester manufacturing techniques. The adduct is prepared by reacting a dibasic carboxylic acid with alkylene oxides, preferably ethylene oxide or propylene oxide, in the presence of a catalyst. Preferred dicarboxylic acids are $C_6$–$C_{12}$ aliphatic acids such as adipic acid, azelaic acid, sebacic acid or dodecane dicarboxylic acid. Mixtures of these acids or mixtures of the aliphatic dicarboxylic acids also yield suitable hydroxy functional oligoesters.

The preparation of oligoesters from monocarboxylic acids and polyepoxides is well known and is described, for example, in U.S. Pat. Nos. 2,456,408 and 2,653,141. Numerous hydroxy functional oligoesters within this general category will be apparent to those skilled in the art.

The third type of hydroxy functional oligoesters, i.e., those prepared by reaction of a hydroxy functional monocarboxylic acid with an epoxide is described in U.S. Pat. No. 3,404,018. While the epoxides employed in accordance with the teachings of that patent are polyepoxides, oligoesters may be prepared in a similar manner to that described therein by employing a monoepoxide, such as an alkylene oxide, and a hydroxy functional monocarboxylic acid as described therein. Numerous monoepoxide materials suitable for this purpose will be apparent to those skilled in the art.

Among the numerous monomeric polyols which may be employed as the hydroxy functional additive are the various short chain glycols of up to and including 21 carbon atoms which are useful in preparing the hydroxy functional polyesters discussed above. Other conventional polyhydric alcohols such as glycerols and sugar alcohols are also among the numerous monomeric polyols which will be apparent to those skilled in the art. Triols which may be used in the synthesis of the hydroxy functional organophosphate ester may be employed as all or part of the monmeric polyol in the composition of the invention.

The hydroxyl bearing copolymer useful as the hydroxy functional additive may be formed from monoethylenically unsaturated monomers, with between about 2.5 and 30 weight percent bearing hydroxy functionality.

The suitable hydroxy functional monomers for preparation of the hydroxy functional resins useful in the invention are the same as those useful in preparation of the bifunctional copolymer discussed above.

The remainder of the monomers forming the hydroxy functional copolymer, i.e., between about 90 and about 70 weight percent, are other monoethylenically unsaturated monomers. These monoethylenically unsaturated monomers, as was the case with respect to the bifunctional copolymer discussed above, are preferably alpha-beta olefinically unsaturated monomers. As was also the case with respect to the bifunctional copolymer, the preferred alpha-beta olefinically unsaturated monomers are acrylates and preferably are employed in excess of 50 weight percent of the total copolymer. Preferred acrylate monomers are esters of $C_1$–$C_{12}$ monohydric alcohols and acrylic or methacrylic acids. Monovinyl hydrocarbons and other modifying monomers may also be employed in the same proportion as they are employed in the bifunctional copolymer discussed above.

Other Materials

In addition to the above discussed components, other materials may be included in the high solids coating compositions of the invention. These include materials such as catalysts, antioxidants, U.V. absorbers, solvents, surface modifiers and wetting agents as well as pigments. The solvents used in the coating compositions of the invention are those which are commonly used. Typical solvents useful in the coating compositions facilitate spray application at high solids content and include toluene, xylene, methyethyl ketone, acetone, 2-ethoxy-1-ethanol, 2-butoxy-1-ethanol, diacetone alcohol, tetrahydrofuran, ethylacetate, dimethylsuccinate, dimethylglutarate, dimethyladipate or mixtures thereof. The solvent in which the bifunctional copolymer of the coating composition is prepared, may be employed as the solvent for the coating composition thus eliminating the need for drying the bifunctional copolymer after preparation if such is desired. As mentioned above, the nonvolatile solids content of the high solids coating composition is at least 60 percent and preferably 70 percent or more, thus limiting the amount of solvent included in the composition.

Surface modifiers or wetting agents are common additives for liquid paint compositions. The exact mode of operation of these surface modifiers is not known, but it is thought that their presence contributes to better adhesion of the coating composition to the surface being coated and helps formation of thin coating on surfaces, particularly metal surfaces. These surface modifiers are exemplified by acrylic polymers containing 0.1–10 percent by weight of a copolymerized monoethylenically unsaturated carboxylic acids such as methacrylic acid, acrylic acid or itaconic acid, cellulose acetate butyrate, silicon oils or mixtures thereof. Of course, the choice of surface modifier or wetting agent is dependent upon the type of surface to be coated and selection of the same is clearly within the skill of the artisan.

The high solids coating composition of the invention also may include pigments. As noted above, the high solids composition of this invention are particularly useful when the coating composition includes metallic flake as a pigment. The rapid set and curing of the composition eliminates problems associated with redistribution of the metallic flake in the composition. The amount of pigment in the high solids coating composition may vary, but preferably is between 3 and about 45 weight percent based on the total weight of the paint composition. If the pigment is metallic flake, the amount ranges from about 1 to about 7 weight percent.

Application Techniques

The high solids coating composition can be applied by conventional methods known to those in the art. These methods include roller coating, spray coating, dipping or brushing and, of course, the particular application technique chosen will depend on the particular substrate to be coated and the environemnt in which the coating operation is to take place.

A particularly preferred technique for applying the high solids coating compositions, particularly when applying the same to automobiles as topcoats, is spray coating through the nozzle of a spray gun.

The invention will be further understood by referring to the following detailed examples. It should be understood that the specific examples are presented by way of illustration and not by way of limitation. Unless otherwise specified, all references to "parts" is intended to mean parts by weight.

EXAMPLE 1

(a) In a three-necked, round bottom, two liter flask, equipped with a stirrer, a condenser and a dropping funnel, 750 ml of toluene is brought to reflux under nitrogen. The following mixture of monomers, containing 15 grams of 2,2'-azobis-(2-methyl propionitrile) dissolved in 50 ml acetone, is added dropwise to the refluxing toluene.

|  | Weight Gram | Weight Percent |
|---|---|---|
| Butyl methacrylate | 150 | 50 |
| Glycidyl methacrylate | 45 | 15 |
| Hydroxypropyl methacrylate | 30 | 10 |
| Methyl methacrylate | 60 | 20 |
| Styrene | 15 | 5 |

The addition of the initiator and monomer solution is completed in three hours. The reaction mixture is refluxed for half an hour more and 10 ml of acetone solution of 2 grams of the above initiator is added dropwise and the reaction mixture refluxed for half an hour. Part of the solvent is distilled out to bring the solids content to 66% by weight.

(b) Five Hundred (500) grams of dry (dried over molecular sieves)2-ethyl-1,3-hexanediol are added to a three-necked round bottom flask equipped with a stirrer, dropping funnel and a thermometer under nitrogen. Phosphorus pentoxide is added portionwise with continuous stirring. An exothermic reaction occurs and the addition of phosphorus pentoxide is regulated to maintain the temperature at 50° C. Test portions of the reaction mixture are drawn at short intervals of time and titrated with potassium hydroxide solution. The addition of $P_2O_5$ is continued until the acid equivalent weight reaches about 280. The reaction mixture is stirred at 50° C. for one more hour and then filtered. Its equivalent weight, by titration with KOH solution is 271.

Twenty (20) parts of (a) are mixed with 7 parts of Cymel 301 and the mixture dissolved in ten (10) parts of butyl acetate, 4.5 parts of hydroxy phosphate (b) is added to the above solution and the resulting formulation drawn on a steel test panel. The panel is baked at 100° C. for 20 minutes to obtain a glossy (86/20°) panel with excellent hardness, adhesion and solvent (xylene and methyl ethyl ketone) resistance.

EXAMPLE 2

Twenty-five (25) parts of the copolymer described in Example 1(a), fifteen (15) parts of Cymel 301 and 16 parts of polyester Desmophen KL5-2330 (Mobay Chemical Company) are dissolved in 16 parts of butyl acetate. Hydroxy phosphate from Example 1(b), 5.7 parts is added to the above solution and the resulting formulation spray applied to primed test panels. The panels are baked at 100° C. for 20 minutes to obtain a glossy (93/20°) coating with excellent hardness, adhesion and solvent (xylene and methyl ethyl ketone) resistance. The coating, when placed in a Cleveland Humidity Chamber for 14 days does not show any blistering or loss of adhesion, gloss or solvent resistance.

EXAMPLE 3

(a) A copolymer is prepared by following the procedure described in Example 1(a) in methyl amyl ketone at 125° C. and by using the following monomers:

|  | Weight Percent |
|---|---|
| Butyl methacrylate | 50 |
| Ethylhexyl acrylate | 10 |
| Glycidyl methacrylate | 15 |
| Hydroxypropyl methacrylate | 10 |
| Methyl methacrylate | 10 |
| Styrene | 5 |

Tert-butyl peroctoate (5.25% of monomers) is used as initiator and determined solids content is 56.6% by weight. The calculated Tg of the copolymer is 25° C. and the molecular weight from Gel Permeation Chromatography is found to be $\overline{M}n=4220$ and $\overline{M}_w/\overline{M}_n=1.90$ (b) By following the procedure described in Example 1(b), hydroxy phosphate with an acid equivalent weight of 400 is prepared from phosphorus pentoxide and 2-ethyl-1,3 hexanediol.

A millbase is prepared by dispensing titanium dioxide in the polymer (a) with a high speed Cowl's blade. The composition of the millbase is: 15% polymer (100% nonvolatile), 65% titanium dioxide and 20% methyl amyl ketone. Seventy-two (72) parts of this millbase, 31 parts of the polymer, 12.5 parts of bis-(hydroxypropyl) azelate, 34 parts of Cymel 301 and 29 parts of methyl amyl ketone are taken up in a plastic bottle. Twelve (12) parts of hydroxy phosphate (equivalent weight 400), described under (b), are added to the above mixture and the resulting formulation spray applied to both primed and unprimed steel panels. The panels are baked at 120° C. for 20 minutes to obtain hard, glossy coatings with excellent adhesion. The coating has an excellent solvent and humidity resistance.

EXAMPLE 4

(a) By following the procedure described in Example 3(a) a copolymer is prepared from the following monomers:

|  | Weight Percent |
|---|---|
| Butyl methacrylate | 60 |
| Glycidyl methacrylate | 20 |
| Hydroxyethyl acrylate | 10 |
| Styrene | 10 |

The calculated Tg of the polymer is 25° C. and solids content is found to be 54.9% by weight. The molecular weight by Gel Permeation Chromotography is found to be $\overline{M}n=1809$ and $\overline{M}w/\overline{M}n=2.44$ (b) By following the procedure described in Example 1(b) a hydroxy phosphate with acid equivalent weight of 212 is prepared from phosphorus pentoxide and 2-ethyl-1,3 hexanediol.

As described in Example 3, a millbase is prepared from the following materials:

| | |
|---|---|
| Copolymer (a) | 21% (100% nonvolatile) |
| Titanium dioxide | 61% |
| Methyl amyl ketone | 18% |

Sixty-five (65) parts of this millbase, 26.4 parts polymer (a), 12.5 parts bis-(hydroxyl propyl) azelate, 24.9 parts Cymel 301 and 25 parts of methyl amyl ketone are taken up in a plastic bottle. Hydroxy phosphate (b) (Equivalent weight 212), 9.5 parts, is added to the above mixture and the resulting formulation spray applied to both primed and unprimed panels. The panels are baked at 120° C. for 20 minutes to obtain hard, glossy coatings with excellent adhesion and solvent resistance. The coatings, when put in a Cleveland Humidity Chamber for 14 days, do not show any deterioration in general physical properties.

EXAMPLE 5

By following the procedure described in Example 3(a), a copolymer is prepared from the following monomers.

| | Weight Percent |
|---|---|
| Butyl methacrylate | 49 |
| Glycidyl methacrylate | 20 |
| Hydroxypropyl mthacrylate | 10 |
| Methyl methacrylate | 16 |
| Styrene | 5 |

The calculated Tg of the copolymer is 43° C. and solids content is found to be 52%. The molecular weight, by Gel Permeation Chromatography, is found to be, $\overline{M}n=2904$ and $\overline{M}w/\overline{M}n=2.31$.

As described in Example 3, a millbase is prepared with the following composition:

| | Weight Percent |
|---|---|
| Titanium dioxide | 65 |
| The above copolymer | 13 (100% nonvolatile) |
| Methyl amyl ketone | 22 |

Sixty-nine (69) parts of this millbase, 37 parts of the polymer, 17.5 parts bis-(hydroxypropyl) azelate, 29.2 parts Cymel 301 and 22 parts methyl amyl ketone are taken up in a plastic bottle. Hydroxy phosphate (eq. wt. 212) from Example 4(b), 8.5 parts is added to the above mixture and the resulting formulation spray applied to primed test panels. The panels are baked at 115° C. for 20 minutes to obtain glossy, hard coatings with excellent solvent (xylene and methyl ethyl ketone) resistance. These coatings do not show any loss of gloss, adhesion or solvent resistance upon exposure in a Cleveland Humidity Chamber for 14 days.

EXAMPLE 6

By following the procedure described in Example 1(a) a copolymer is prepared in refluxing methyl amyl ketone from the following monomers:

| | Weight Percent |
|---|---|
| Glycidyl methacrylate | 20 |
| Hydroxyethyl acrylate | 10 |
| Butyl methacrylate | 60 |
| Styrene | 10 |

Two percent tert-butyl peroctoate is used as initiator; the solids content is found to be 53.6%. From Gel Permeation Chromotography the molecular weight of the polymer is found to be: $\overline{M}n=2746$ and and $\overline{M}w/\overline{M}n=2.33$ As described in Example 3, a millbase is prepared with the following ingredients:

| | Weight Percent |
|---|---|
| Titanium dioxide | 56 |
| The above Polymer | 26 (100% nonvolatile) |
| Methyl amyl ketone | 18 |

Seventy-one (71) parts of this millbase, 14.6 parts polymer 12.5 parts bis-(hydroxypropyl) azelate, 24.9 parts Cymel 301, 30.6 parts methyl amyl ketone and 8.5 parts hydroxy phosphate (eq. wt. 212) from Example 4(b) are mixed in a plastic container. This formulation is spray applied to primed test panels. The panels are baked at 120° C. for 20 minutes to obtain glossy, hard coatings with excellent solvent (xylene and methyl amyl ketone) resistance. The coatings do not show any loss of gloss, adhesion or solvent resistance upon exposure in a Cleveland Humidity Chamber for 14 days.

EXAMPLE 7

(a) By following the procedure described in Example 1(a), a copolymer is prepared in refluxing toluene from the following monomers:

| | Weight Percent |
|---|---|
| Butyl methacrylate | 50 |
| Ethylhexyl acrylate | 20 |
| Glycidyl methacrylate | 15 |
| Hydroxypropyl methacrylate | 10 |
| Styrene | 5 |

One thousand grams of the total monomers and 700 ml toluene and 50 grams tert-butyl peroctoate are used. The calculated Tg of this polymer is 6° C. and solid content is found to be 59% by weight; a Gel Permeation Chromatogram shows its molecular weight to be: $\overline{M}n=4337$ and $\overline{M}w/\overline{M}n=2.14$. Viscosity of this polymer solution is 1.33 Stokes.

(b) A solution os 1250 grams of 2-ethyl-1,3 hexane diol in 1250 grams of butyl acetate is placed under nitrogen in a three-necked round bottom flask equipped with a mechanical stirrer. Phosphorus pentoxide (442 grams) is added portionwise with continuous stirring, an exothermic reaction occurs and the addition of P2O5 is regulated to maintain the temperature between about 50° C. and about 60° C. After the addition is completed (4 hours), the reaction mixture is stirred for three more hours. The acid equivalent weight, by titration with KOH solution, is found to be 315.

Fifty (50) parts of (a), 20.1 parts Cymel 301 and 9.81 parts of hydroxy phosphate (b) are dissolved in 14 parts of butyl acetate. This formulation spray applied in three coats to primed panels which are baked at 120° C. for 25 minutes to obtain coatings with excellent physical properties.

EXAMPLE 8

Forty (40) parts of polymer solution from Example 1(a) are mixed with 17 parts of butoxymethyl melamine (Cymel 1170), 2 parts of polypropyleneglycol (Pluracol P710, BASF Wyandotte) and 20 parts of butyl acetate. 11.4 parts Hydroxyphosphate from Example 7(b) is added to the above solution and the resulting formulation applied by spraying to primed steel test panels. The panels are baked at 130° C. for 20 minutes to obtain glossy coatings with excellent hardness, adhesion and solvent (xylene and methyl ethyl ketone) resistance.

EXAMPLE 9

In the formulation described in Example 2, 18 parts of ethoxymethoxy benzoguanamine (Cymel 1123) are employed as a crosslinking resin instead of Cymel 301. The resulting formulation is applied by spraying to primed steel test panels. The panels are baked at 130° C. for 20 minutes to obtain glossy coatings with excellent hardness, adhesion and solvent (xylene and methyl ethyl ketone) resistance.

EXAMPLE 10

In this formulation, resins described in Example 3 are employed in exact quantities as described therein except that 42 parts of butoxymethyl glycoluril (Cymel 1170) are used as the crosslinking agent instead of Cymel 301. The formulation is applied by spraying to primed steel panels and baked at 130° C. for 20 minutes to obtain hard, glossy coatings with excellent adhesion and solvent (xylene and methyl ethyl ketone) resistance.

EXAMPLE 11

In the formulation described in Example 4, 35 parts of butoxymethylurea resin (Beetle 80, American Cyanamid) are substituted for Cymel 301, and the resulting formulation spray applied to primed steel panels. The panels are baked at 130° C. for 20 minutes to obtain hard, glossy coatings with excellent adhesion and solvent (xylene and methyl ethyl ketone) resistance.

EXAMPLE 12

Ninety-eight (98) grams of phosphoric acid and 50 ml of butyl acetate are placed in a round bottom flask fitted with a condenser and a dropping funnel and cooled with an ice-water mixture. Propylene oxide, 136 grams, is added dropwise with continuous stirring. The addition is complete in two hours. Six parts of this hydroxyphosphate are substituted for the hydroxyphosphate used in Example 4. The resulting formulation is applied by spraying to primed steel test panels, and the panels baked at 120° C. for 20 minutes to obtain hard, glossy coatings with excellent adhesion and solvent resistance.

EXAMPLE 13

Fifty (50) grams of 1,4-benzenedimethanol are dissolved in 150 grams of 2-ethyl-1,3-hexanediol and 40 ml of butyl acetate. Phosphorus pentoxide is added to the above solution as described in Example 1(b) to obtain a hydroxyphosphate with an acid equivalent weight of 364.

Thirty (30) parts of the polymer solution from Example 1(a), 11 parts of Cymel 301, 2 parts of caprolactone based hydroxypolyester (PCPO 300, Union Carbide) are dissolved in 10 parts of butyl acetate. The above hydroxyphosphate (8.9 parts) is added to the above solution and the resulting formulation applied by spraying to primed steel test panels. The panels are baked at 130° C. for 20 minutes to obtain a hard, glossy coating with excellent adhesion and solvent (xylene and methyl ethyl ketone) resistance.

EXAMPLE 14

One hundred (100) grams of 1,4-cyclohexanedimethanol are dissolved in 80 grams of butyl acetate at 50° C. and the procedure outlined in Example 11(b) is followed to obtain a hydroxyphosphate with an acid equivalent weight of 645.

The procedure of Example 3 is modified by substituting 18.9 parts of the above hydroxyphosphate for the hydroxyphosphate used therein and three more parts of Cymel 301 are added to the formulation. The resulting paint is applied by spraying to primed steel test panels and the panels baked at 130° C. for 20 minutes to obtain hard, glossy coatings with excellent adhesion and solvent (xylene and methyl ethyl ketone) resistance.

EXAMPLE 15

A copolymer is prepared from the following monomers by following the procedure described in Example 1(a).

|  | Weight Percent |
| --- | --- |
| Butyl methacrylate | 50 |
| Ethylhexyl acrylate | 10 |
| Glycidyl methacrylate | 15 |
| Hydroxypropyl methacrylate | 10 |
| Methyl methacrylate | 10 |
| Styrene | 5 |

Toluene is used as solvent to obtain a 60% solution of the polymer; tert-butyl peroctoate (3.7% of monomers) is used as an initiator. Toluene (60%) is distilled off and butyl acetate is added to bring the solids level to 60% by weight. The calculated Tg of the polymer is 25° C. and the molecular weight by Gel Permeation Chromatography is found to be $\overline{Mn}=5301$, $\overline{Mw}/\overline{Mn}=2.9$.

Three hundred (300) parts of this polymer are mixed well with 10.69 parts of aluminum flakes (65% in naphtha), 3.40 parts of zinc naphthanate, and 92 parts of hexamethoxymethyl melamine (Cymel 301) are added to this mixture. 59.98 parts of the hydroxyphosphate from Example 7(b), and 40 parts of bis-(hydroxypropyl)azelate are dissolved in 50 ml of cellusolve acetate; this solution is added to the above mixture and the resulting formulation applied by spraying to primed steel panels in three coats. The panels are baked at 130° C. for 20 minutes to obtain silver metallic coatings with excellent physical properties. The coatings show no blistering, discoloration, or loss of gloss or adhesion.

EXAMPLE 16

The polymer synthesis described in Example 15 is repeated by employing 5% (based on monomers) of the initiator. Toluene is distilled out to the extent of 90% and butyl acetate is then added to bring the solids level to 60% by weight. The molecular weight from Gel Permeation Chromatography is found to be $\overline{Mn}=3262$, $\overline{Mw}/\overline{Mn}=3.63$.

One Hundred Twenty Six (126) parts of the above polymer solution, 39.1 parts of Cymel 301, 6.3 parts of aluminum flakes (65% in naphtha), and 2.1 parts of zinc naphthanate are mixed well. 15.5 parts of hydroxyphosphate from Example 4(b) and 13 parts of bis-(hydroxypropyl)azelate are dissolved in 50 ml methyl amyl ketone and this solution is added to the above mixture. The viscosity of this coating is 38 seconds #4 Ford Cup and the solids level is 61% by weight. The panel is applied and baked as described in Example 15. This coating has excellent adhesion, gloss, hardness and solvent (xylene and methyl amyl ketone) resistance.

In view of this disclosure, many modifications of this invention will be apparent to those skilled in the art. It is inteded that all such modifications which fall within the true scope of this invention be included within the terms of the appended claims.

I claim:

1. A thermosetting coating composition adapted for low temperature bake applications which contains greater than about 60% by weight of nonvolatile solids, and which, exclusive of pigments, solvents and other nonreactive components, consists essentially of:
   (A) a bifunctional copolymer bearing hydroxy functionality and pendent epoxy functionality, having a number average molecular weight ($\overline{Mn}$) of between about 1500 and about 10,000 and a glass transition temperature (Tg) of between about 31° 25° C. and about 70° C., said copolymer consisting essentially of (i) between about 5 and about 25 weight percent of monoethylenically unsaturated monomers bearing glycidyl functionality and between about 5 and about 25 weight percent of monoethylenically unsaturated monomer bearing hydroxy functionality, with the total of said glycidyl and hydroxy functional monomers being not greater than about 30 weight percent of the monomers in said bifunctional copolymer and (ii) between about 90 and about 70 weight percent of other monoethylenically unsaturated monomers;
   (B) a reactive catalyst comprising hydroxy functional organophosphate ester having the formula:

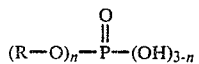

wherein n=1 to 2 and R is selected from the group consisting of mono or dihydroxy alkyl, cycloalkyl, or aryl radicals;
   (C) an amine-aldehyde crosslinking agent; and
   (D) up to about 45 weight percent based on the total weight of (A), (B), (C) and (D) of a hydroxy functional additive having a number average molecular weight ($\overline{Mn}$) of between about 150 and about 6000, said organophosphate ester being included in said composition in an amount sufficient to provide between about 0.67 and about 1.4 equivalents of acid functionality for each equivalent of pendent epoxy functionality on said bifunctional copolymer, and said amine-aldehyde crosslinking agent being included in said composition in an amount sufficient to provide at least about 0.4 equivalents of nitrogen crosslinking functionality for each equivalent of hydroxy functionality included in said composition either as (i) an organic hydroxyl group on said organophosphate ester, (ii) a hydroxyl group on on said bifunctional copolymer, (iii) a hydroxyl group on said hydroxy functional additive, or (iv) as a result of esterification of said pendent epoxy functionality of said bifunctional copolymer during cure of said coating composition.

2. A composition in accordance with claim 1, wherein said monoethylenically unsaturated monomers bearing glycidyl functionality in said bifunctional copolymer are selected from glycidyl esters and glycidyl ethers.

3. A composition in accordance with claim 2, wherein said monoethylenically unsaturated monomers bearing glycidyl functionality are selected from glycidyl esters of monoethylenically unsaturated carboxylic acids.

4. A composition in accordance with claim 1 wherein said monoethylenically unsaturated monomers bearing hydroxy functionality in said bifunctional copolymer are selected from the group consisting of hydroxyalkyl acrylates formed by the reaction of $C_2$–$C_5$ dihydric alcohols and acrylic or methacrylic acids.

5. A composition in accordance with claim 1, wherein said other monoethylenically unsaturated monomers in said bifunctional copolymer are selected from the group consisting of acrylates and other monoethylenically unsaturated vinyl monomers.

6. A composition in accordance with claim 5 wherein said acrylate monomers comprise at least about 50 weight percent of the total monomers in said bifunctional copolymer and are selected from its group consisting of esters of $C_1$–$C_{12}$ monohydric alcohols and acrylic or methacrylic acids.

7. A composition in accordance with claim 1 wherein said hydroxy functional organophosphate esters are esters wherein R is a mono or dihydroxy alkyl, cycloalkyl or aryl radical containing 3 to 10 carbon atoms.

8. A composition in accordance with claim 1 wherein said organophosphate ester is a monoester.

9. A composition in accordance with claim 1, wherein said organophosphate ester is a diester.

10. A composition in accordance with claim 1, wherein said organophosphate ester is a mixture of mono- and diesters.

11. A composition in accordance with claim 10 wherein said hydroxy functional organophosphate esters are esters wherein R is a mono- or dihydroxy alkyl, cycloalkyl or aryl radical containing 3 to 10 carbon atoms.

12. A composition in accordance with claim 10, wherein at least a portion of said organophosphate esters are esters wherein R is mono- or dihydroxy alkyl radical containing 3 to 10 carbon atoms.

13. A composition in accordance with claim 1 wherein said reactive catalyst including said organophosphate ester is the reaction product of an excess of an alkyl, cycloalkyl or aryl diol or triol and phosphorus pentoxide.

14. A composition in accordance with claim 1 wherein said reactive catalyst including said hydroxy functional organophosphate ester is the reaction product of an excess of an alkyl, cycloalkyl or aryl triol in which at least one of the hydroxyl groups is secondary and phosphorus pentoxide.

15. A composition in accordance with claim 1 wherein said reactive catalyst including said hydroxy functional organophosphate ester is the reaction product of an alkyl, cycloalkyl or aryl monoepoxide and phosphoric acid in a molar ratio of between about 1:1 and about 2:1.

16. A composition in accordance with claim 15 wherein said monoepoxide also bears hydroxy functionality.

17. A composition in accordance with claim 15 wherein said monoepoxide is selected from monoepoxy esters, monoepoxy ethers and alkylene oxides.

18. A composition in accordance with claim 1, wherein said amine-aldehyde crosslinking agent is selected from the group consisting of condensation products of formaldehyde with melamine, substituted melamine, urea, benzoguanamine and substituted benzoguanamine, and mixtures of said condensation products, and is included in an amount sufficient to provide between about 0.6 and about 2.1 equivalents of nitrogen crosslinking functionality per equivalent of hydroxy functionality.

19. A composition in accordance with claim 1, wherein said hydroxy functional additive is selected from the group consisting of (i) hydroxy functional polyesters, (ii) hydroxy functional polyethers, (iii) hydroxy functional oligoesters, (iv) monomeric polyols; (v) hydroxy functional copolymers formed from monoethylenically unsaturated monomers, one or more of which bears hydroxy functionality and which is included in said copolymer in amounts ranging from about 2.5 to about 30 weight percent of said copolymer, and (vi) mixtures of (i)–(v).

20. A composition in accordance with claim 1, wherein said organophosphate ester is included in said composition in an amount sufficient to provide between about 1 and about 1.2 equivalents of acid functionality for each equivalent of pendant epoxy functionality on said bifunctional copolymer.

* * * * *